United States Patent
Yu et al.

(10) Patent No.: US 11,949,214 B2
(45) Date of Patent: Apr. 2, 2024

(54) ELECTRIC POWER DISTRIBUTION PANEL

(71) Applicant: Delta Electronics, Inc., Taoyuan (TW)

(72) Inventors: Simon Hoi-Keung Yu, Taoyuan (TW); Vincent Mark Byrne, Taoyuan (TW); Shan-Chun Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 864 days.

(21) Appl. No.: 17/027,392

(22) Filed: Sep. 21, 2020

(65) Prior Publication Data

US 2021/0344175 A1    Nov. 4, 2021

Related U.S. Application Data

(60) Provisional application No. 63/017,314, filed on Apr. 29, 2020.

(51) Int. Cl.
*H02B 1/048* (2006.01)
*H02B 1/052* (2006.01)
*H02B 1/24* (2006.01)

(52) U.S. Cl.
CPC ............ *H02B 1/048* (2013.01); *H02B 1/052* (2013.01); *H02B 1/24* (2013.01)

(58) Field of Classification Search
CPC .......... H02B 1/048; H02B 1/052; H02B 1/24; H02B 1/0565
USPC .................................................. 361/636, 634
See application file for complete search history.

(56) References Cited

U.S. PATENT DOCUMENTS

| | | | | |
|---|---|---|---|---|
| 5,439,396 A * | 8/1995 | Magdaleno | ............ | H02B 1/056 439/716 |
| 5,726,852 A * | 3/1998 | Trifiletti | ................ | H02B 1/056 361/636 |
| 6,157,287 A * | 12/2000 | Douglass | ............. | H01H 85/203 361/833 |
| 7,286,340 B2 * | 10/2007 | Karim | .................... | H02B 1/042 200/50.01 |

(Continued)

FOREIGN PATENT DOCUMENTS

| | | |
|---|---|---|
| CN | 103477517 A | 12/2013 |
| JP | 2012226971 A | 11/2012 |
| TW | 200515668 A | 5/2005 |

*Primary Examiner* — Stephen S Sul
(74) *Attorney, Agent, or Firm* — KIRTON McCONKIE; Evan R. Witt

(57) ABSTRACT

An electric power distribution panel is provided. The electric power distribution panel includes a first input bus, a second input bus, a plurality of brackets and a plurality of circuit breaker modules. The first and second input buses are coupled to a first power source and a second power source respectively. The plurality of brackets is electrically connected to the first and second input buses. The plurality of circuit breaker modules are assembled to the plurality of brackets respectively. Each of the plurality of circuit breaker modules includes a circuit breaker and an adapter detachably assembled to the circuit breaker. In each of the plurality of circuit breaker modules, the circuit breaker is electrically connected to the first input bus when the adapter is removed from the circuit breaker, and the circuit breaker is electrically connected to the second input bus when the adapter is assembled to the circuit breaker.

14 Claims, 8 Drawing Sheets

(56) References Cited

U.S. PATENT DOCUMENTS

| | | | |
|---|---|---|---|
| 7,468,883 B2 * | 12/2008 | Mann | H02B 1/056 361/647 |
| 2008/0278890 A1 * | 11/2008 | Mann | H02B 1/056 361/636 |
| 2013/0201608 A1 * | 8/2013 | Mills | H02B 1/04 361/636 |

* cited by examiner

ELECTRIC POWER DISTRIBUTION PANEL

CROSS-REFERENCE TO RELATED APPLICATION

This application claims the benefit of U.S. Provisional Application No. 63/017,314 filed on Apr. 29, 2020, entitled "BULLET-TYPE CIRCUIT BREAKER ADAPTER MODULE". The entire contents of the above-mentioned patent applications are incorporated herein by reference for all purposes.

FIELD OF THE INVENTION

The present disclosure relates to an electric power distribution panel, and more particularly to an electric power distribution panel with selectable output voltages.

BACKGROUND OF THE INVENTION

Electric power distribution panels are widely used to distribute electric power from an input power source to multiple loads via circuit breakers. Usually, the electric power distribution panel includes a plurality of brackets for disposing circuit breakers. Each bracket is electrically connected to an input bus for providing a specific voltage to the circuit breaker assembled to that bracket. Under normal conditions, the circuit breaker is turned on to transmit the received voltage to the load. Once an over-current condition is detected, the circuit breaker is turned off automatically to cut off the electrical connection between the load and the input power source.

However, the multiple loads can only receive the same voltage from the electric power distribution panel, namely the voltage provided to the multiple loads cannot be varied according to actual requirements, which reduces the applicability.

Therefore, there is a need of providing an electric power distribution panel to obviate the drawbacks encountered from the prior arts.

SUMMARY OF THE INVENTION

It is an objective of the present disclosure to provide an electric power distribution panel having two input buses coupled to two power sources respectively. The circuit breaker is electrically connected to one of the input buses adaptively through an adapter assembled thereto. Whereas, when the adapter is removed from the circuit breaker, the circuit breaker is electrically connected to the other input bus. Consequently, the circuit breaker is selectively coupled to two input buses, and the electric power distribution panel can provide two different output voltages, which improves the applicability.

In accordance with an aspect of the present disclosure, there is provided an electric power distribution panel. The electric power distribution panel includes a first input bus, a second input bus, a plurality of brackets and a plurality of circuit breaker modules. The first and second input buses are coupled to a first power source and a second power source respectively. The plurality of brackets is electrically connected to the first and second input buses. The plurality of circuit breaker modules are assembled to the plurality of brackets respectively. Each of the plurality of circuit breaker modules includes a circuit breaker and an adapter detachably assembled to the circuit breaker. In each of the plurality of circuit breaker modules, the circuit breaker is electrically connected to the first input bus when the adapter is removed from the circuit breaker, and the circuit breaker is electrically connected to the second input bus when the adapter is assembled to the circuit breaker.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
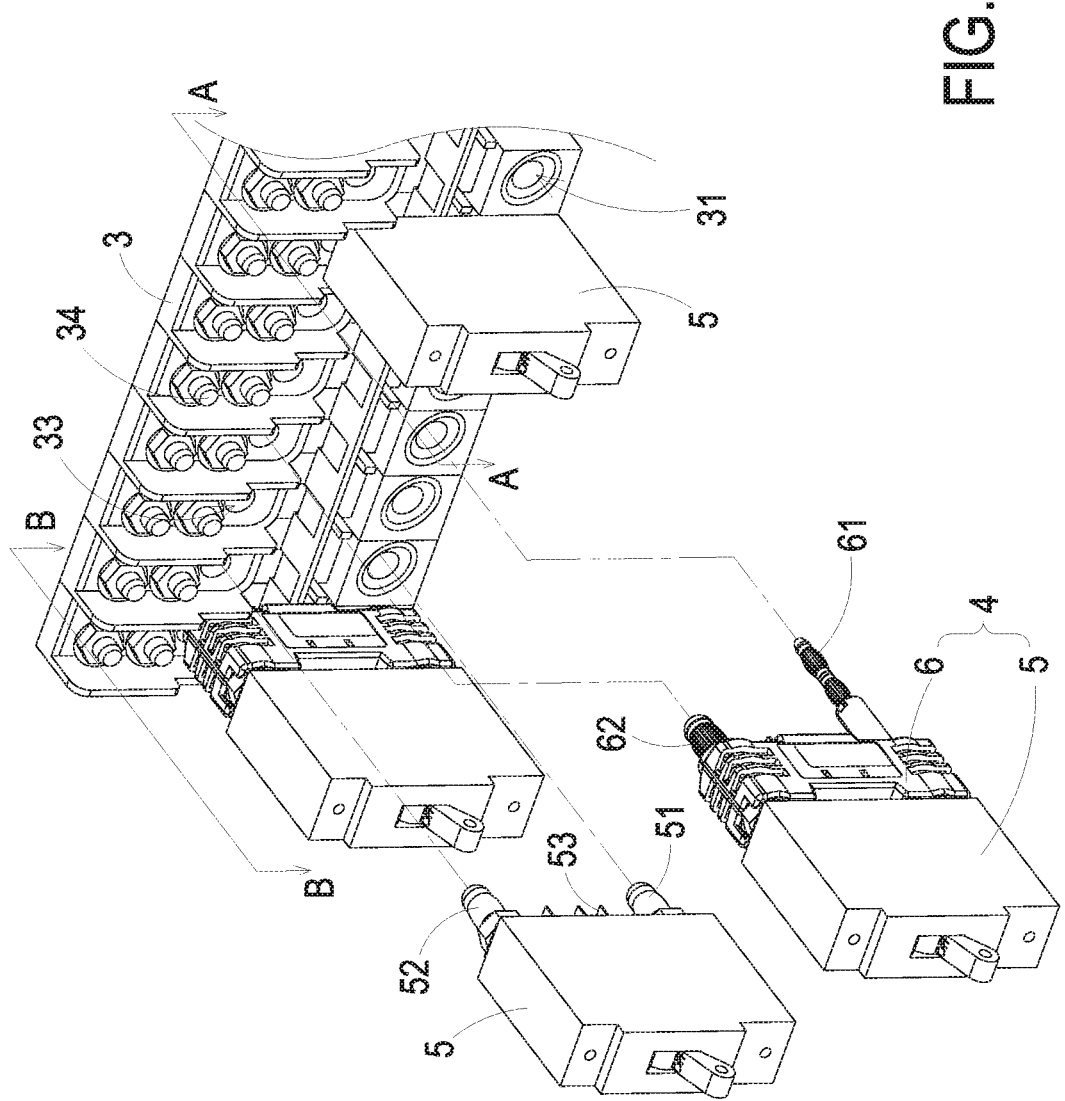
FIG. 1 is a schematic perspective view illustrating an electric power distribution panel according to an embodiment of the present disclosure.
Figure 2A:
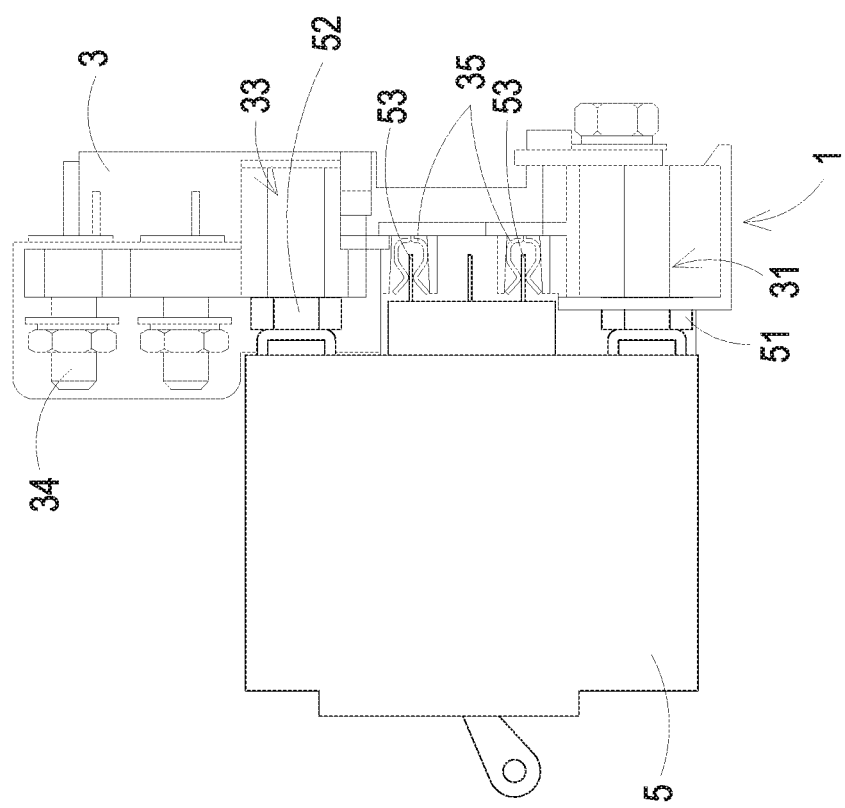
FIG. 2A and FIG. 2B are schematic cross-sectional views showing the electric power distribution panel of FIG. 1 along the sections AA and BB respectively.
Figure 2B:
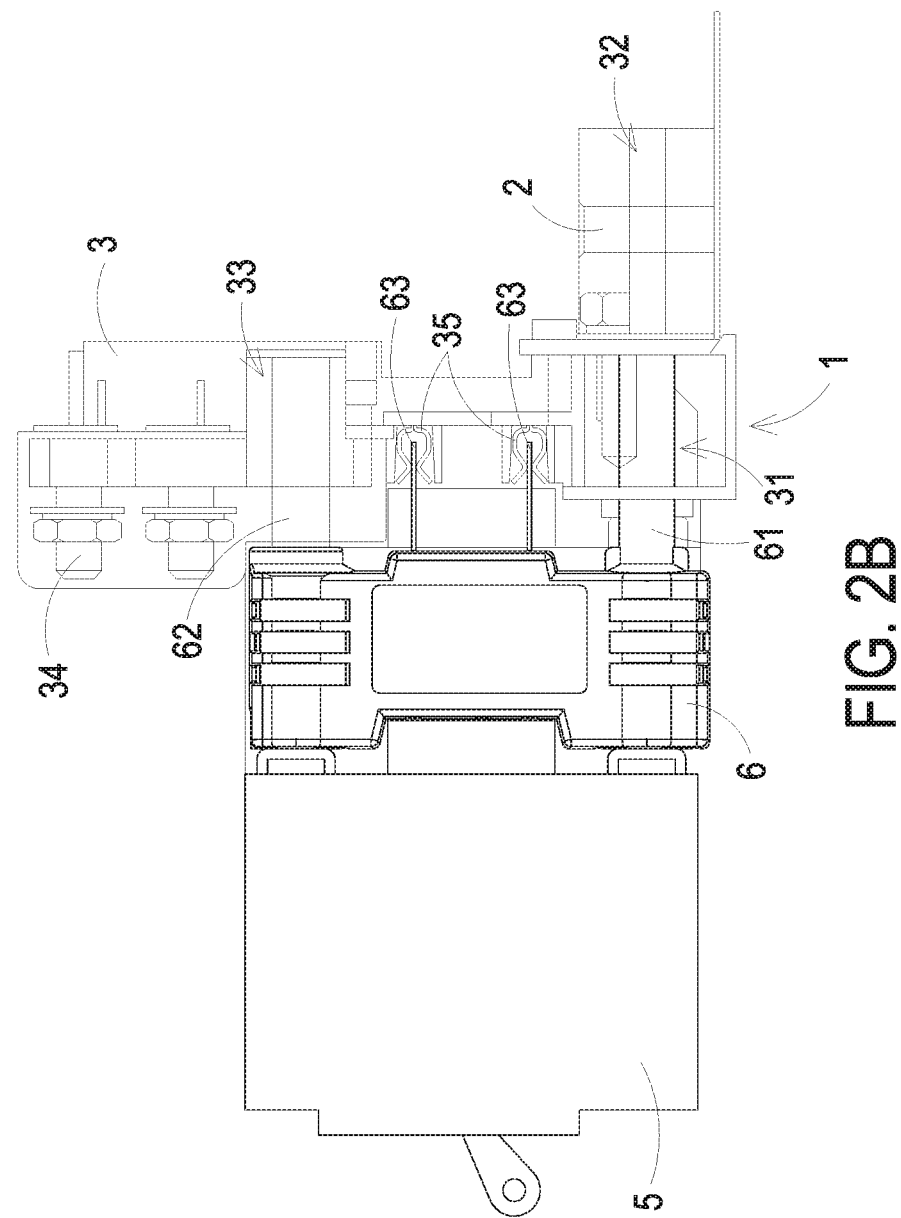

FIG. 1 is a schematic perspective view illustrating an electric power distribution panel according to an embodiment of the present disclosure. FIG. 2A and FIG. 2B are schematic cross-sectional views showing the electric power distribution panel of FIG. 1 along the sections AA and BB respectively. As shown in FIGS. 1, 2A and 2B, the electric power distribution panel includes a first input bus 1, a second input bus 2, a plurality of brackets 3 and a plurality of circuit breaker modules 4. The first and second input buses 1 and 2 are coupled to a first power source and a second power source respectively, and the first and second power sources provide two different voltages respectively. The plurality of brackets 3 is electrically connected to the first and second input buses 1 and 2, and each of the plurality of brackets 3 includes an output port 34 for providing an output voltage to the loads (not shown). The output port 34 may include one or more output terminals (e.g., the two output terminals shown in FIG. 1), and the number of the output terminal is not limited. The plurality of circuit breaker modules 4 are assembled to the plurality of brackets 3 respectively. Each of the plurality circuit breaker modules 4 includes a circuit breaker 5 and an adapter 6 detachably assembled to the circuit breaker 5. The circuit breaker 5 is turned on or off to electrically connect or disconnect the load to the power source. In each of the plurality of circuit breaker modules 4 and the corresponding bracket 3, the circuit breaker 5 is electrically connected to the first input bus 1 when the adapter 6 is removed from the circuit breaker 5 (see FIG. 2A), and the circuit breaker 5 is electrically connected to the second input bus 2 through the adapter 6 when the adapter 6 is assembled to the circuit breaker 5 (see FIG. 2B).

Consequently, the circuit breaker 5 can be electrically connected to different power sources by the detachable adapter 6, and the output port 34 is allowed to provide selectable output voltages accordingly. According to actual requirements, the electric power distribution panel can provide each load connected thereto with suitable voltage, which improves the applicability greatly.

In addition, the adapter 6 is assembled between the circuit breaker 5 and the bracket 3. Compared with the conventional circuit breaker directly assembled to the bracket, the added adapter 6 of the present disclosure only extends the distance between the circuit breaker 5 and the bracket 3. In other words, a projection of the adapter 6 onto the bracket 3 is covered by a projection of the corresponding circuit breaker 5 onto the bracket 3, therefore, the distance between the input bus and the output port of the bracket would not be affected so as to keep the same height for an electric power distribution panel, wherein the electric power distribution panel is installed in a cabinet in real applications.

Figure 3A:
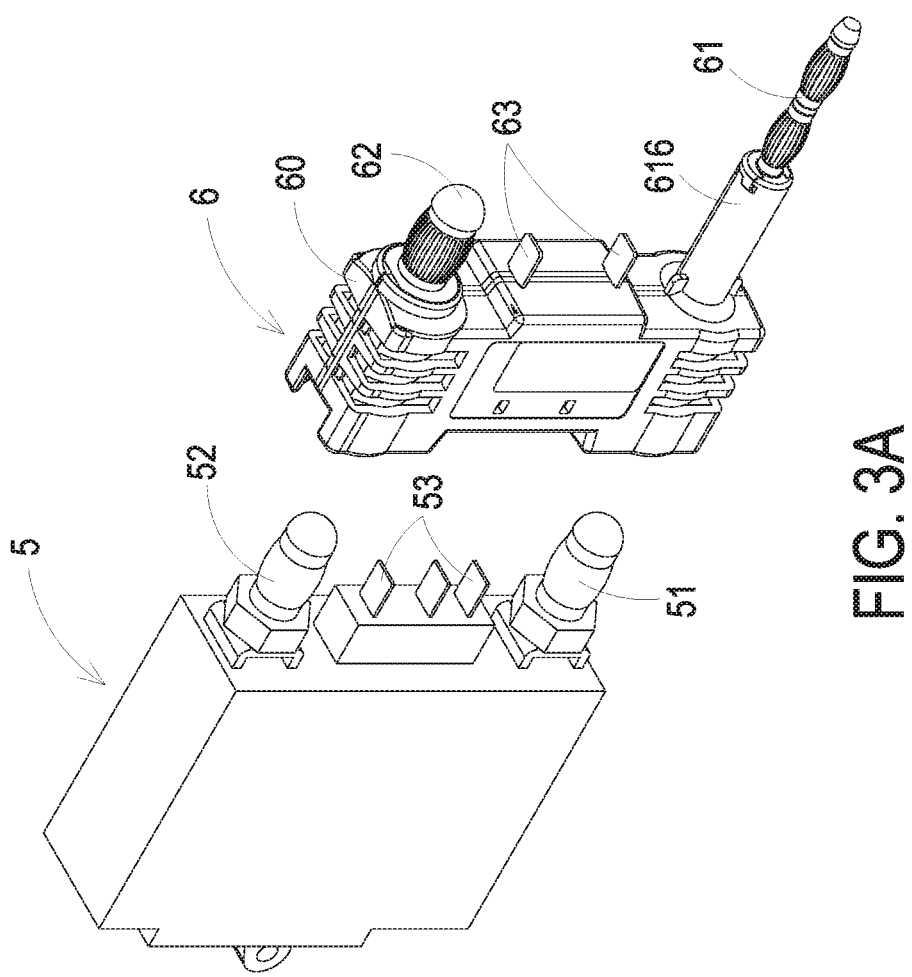
FIG. 3A and FIG. 3B are schematic perspective views illustrating the circuit breaker module of FIG. 1 at different viewing angles.
Figure 3B:
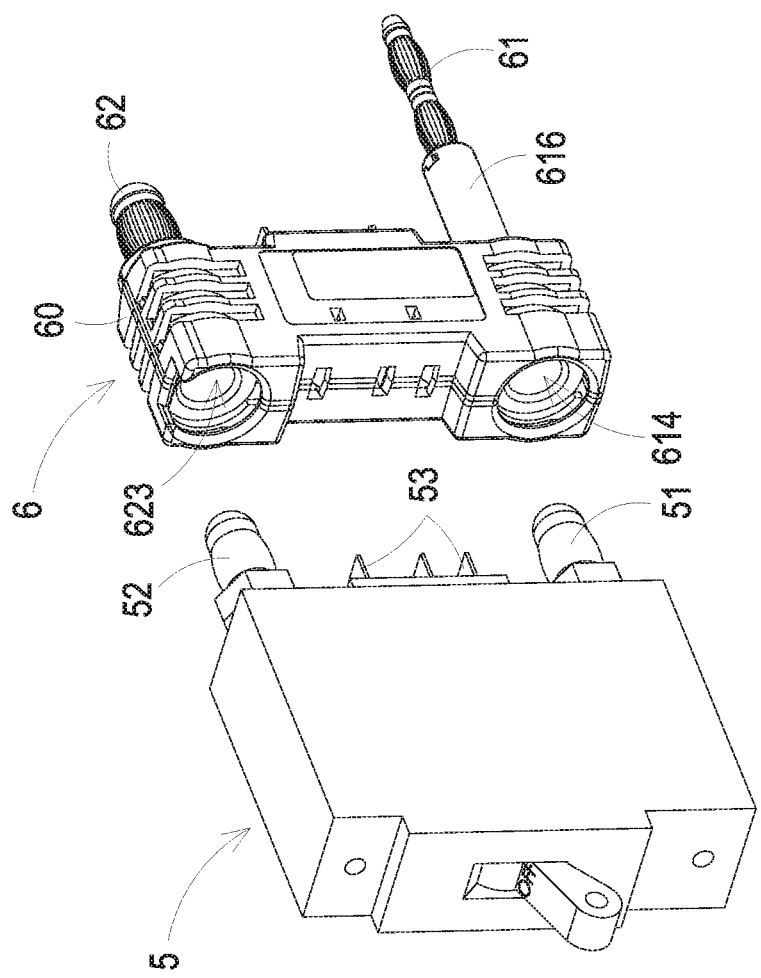
Figure 4:
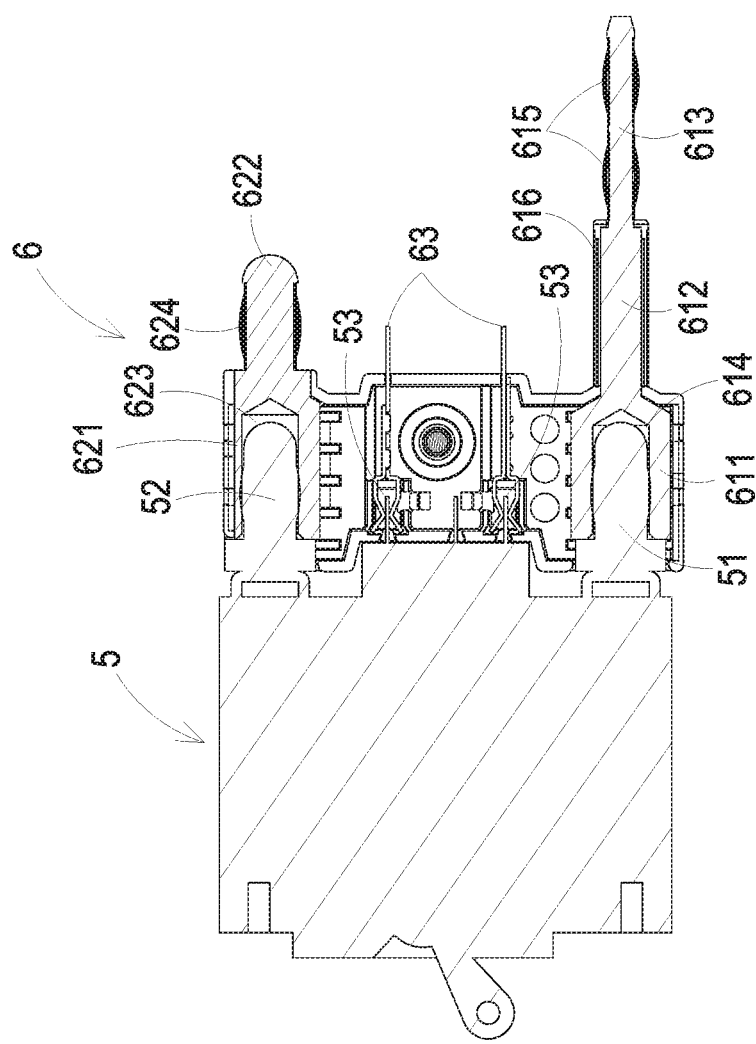
FIG. 4 is a schematic cross-sectional view showing the circuit breaker module of FIG. 1.
Figure 5A:
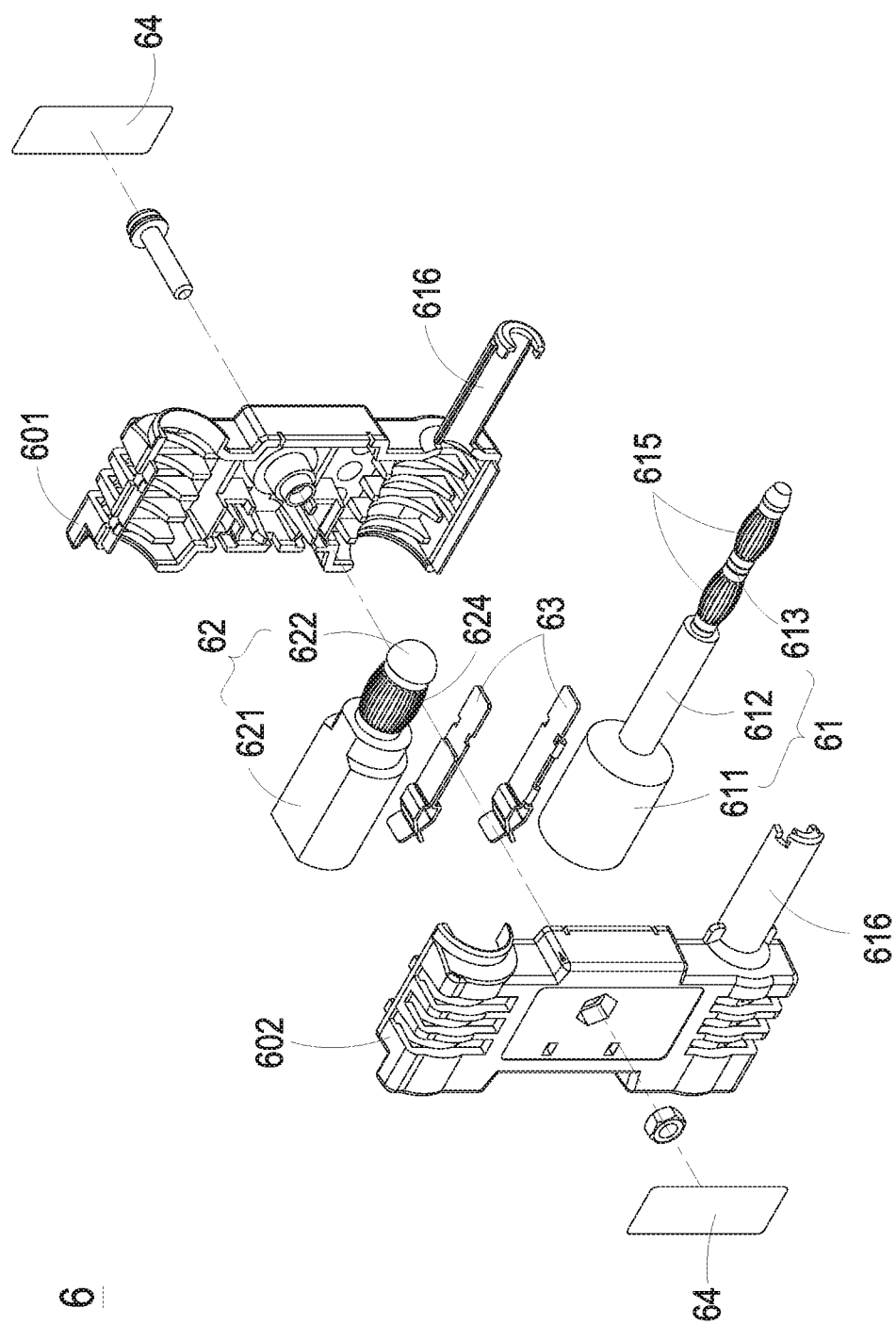
FIG. 5A and FIG. 5B are schematic exploded views illustrating the adapter of FIG. 1 at different viewing angles.
Figure 5B:
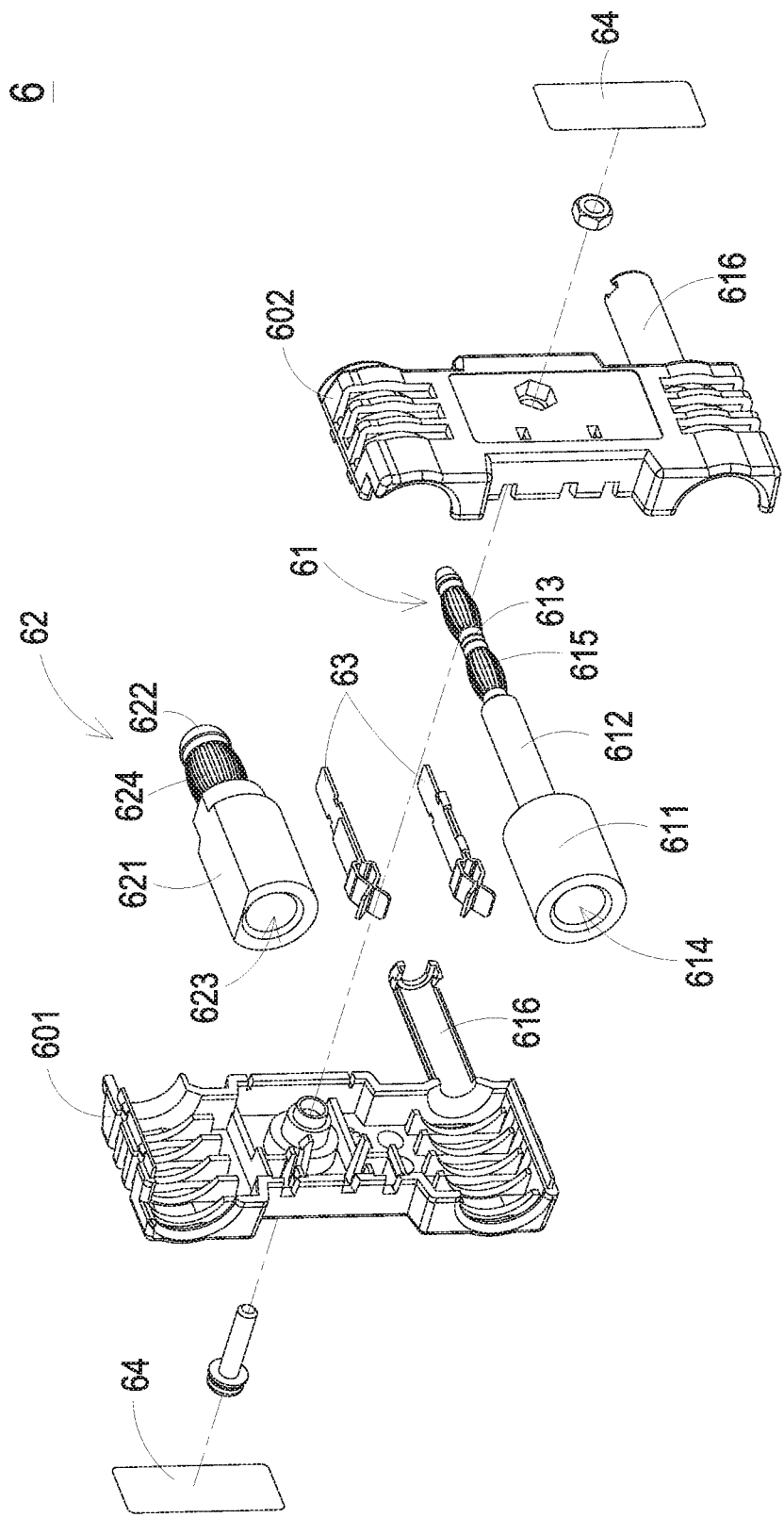

FIG. 3A and FIG. 3B are schematic perspective views illustrating the circuit breaker module of FIG. 1 at different viewing angles. FIG. 4 is a schematic cross-sectional view showing the circuit breaker module of FIG. 1. FIG. 5A and FIG. 5B are schematic exploded views illustrating the adapter of FIG. 1 at different viewing angles. Please refer to FIGS. 1 to 5B. The detailed structure of the electric power distribution panel is exemplified as follows.

The bracket 3 includes a first input hollow portion 31, a second input hollow portion 32 and an output hollow portion 33. The circuit breaker 5 includes an input terminal 51 and an output terminal 52. The adapter 6 includes a housing 60, an input adapting component 61 and an output adapting component 62. The housing 60 is formed by a first assembly 601 and a second assembly 602 assembled to each other and defines an inner space. The input and output adapting components 61 and 62 are at least partially accommodated in the inner space. For example but not exclusively, the first and second assemblies 601 and 602 are securely assembled to each other through engaging or screwing. The input adapting component 61 has a first part 611, a second part 612 and a third part 613 electrically connected to each other. The diameter of the second part 612 is larger than or equal to the diameter of the third part 613. The output adapting component 62 has a first end part 621 and a second end part 622 electrically connected to each other. The input and output terminals 51 and 52 and the input and output adapting components 61 and 62 can be formed by any conductive material, e.g., copper. In an embodiment, the adapter 6 further includes a label 64 attached on the housing 60 for recording the information of the adapter 6.

As shown in FIGS. 1 and 2A, when the adapter 6 is removed from the circuit breaker 5, the input terminal 51 of the circuit breaker 5 is at least partially inserted into the first input hollow portion 31 and is electrically connected to the first input bus 1, and the output terminal 52 is at least partially inserted into the output hollow portion 33 and is electrically connected to the output port 34. Under this circumstance, the output voltage provided by the output port 34 is from the first power source.

As shown in FIGS. 1, 2B and 4, when the adapter 6 is assembled to the circuit breaker 5, the input adapting component 61 is electrically connected to the input terminal 51, and the input adapting component 61 is at least partially inserted into the second input hollow portion 32 and is electrically connected to the second input bus 2. In particular, at least a part of the input adapting component 61 is inserted into the second input hollow portion 32 by penetrating through the first input hollow portion 31. The first part 611 is electrically connected to the input terminal 51. Preferably but not exclusively, the first part 611 has a first recess 614, and the input terminal 51 is engaged in the first recess 614. The second part 612 is inserted and located in the first input hollow portion 31. The second part 612 is covered by an insulation element 616 so as to insulate the input adapting component 61 from the first input bus 1. In an embodiment, the insulation element 616 includes two parts, and the two parts of the insulation element 616 are formed in one piece with the first and second assemblies 601 and 602 respectively. The third part 613 penetrates through the first input hollow portion 31 and is inserted into the second input hollow portion 32, and the third part 613 is electrically connected to the second input bus 2. In addition, when the adapter 6 is assembled to the circuit breaker 5, the output adapting component 62 is electrically connected to the output terminal 52, and the output adapting component 62 is at least partially inserted into the output hollow portion 33 and is electrically connected to the output port 34. In particular, the first end part 621 is electrically connected to the output terminal 52, and the second end part 622 is inserted into the output hollow portion 33 and is electrically connected to the output port 34. Preferably but not exclusively, the first end part 621 has a second recess 623, and the output terminal 52 is engaged in the second recess 623. Under this circumstance, the input terminal 51 is electrically connected to the second input bus 2 through the input adapting component 61, the output terminal 52 is electrically connected to the output port 34 through the output adapting component 62, and the output voltage provided by the output port 34 is from the second power source.

Please refer to FIG. 5A and FIG. 5B. In an embodiment, the third part 613 of the input adapting component 61 includes a first elastic element 615. When the third part 613 is inserted into the second input hollow portion 32, the first elastic element 615 is compressed and abutted against an inner wall of the second input hollow portion 32, and the third part 613 is fixed in the second input hollow portion 32. Moreover, the first elastic element 615 is conductive, and the inner wall of the second input hollow portion 32 is conductive and is electrically connected to the second input bus 2. Therefore, the third part 613 is electrically connected to the second input bus 2 through the contact between the first elastic element 615 and the inner wall of the second input hollow portion 32. In addition, there are two first elastic elements 615 shown in this embodiment. In fact, since the amount of current transmitted by conductive element is determined by the diameter thereof, the number of the first elastic element 615 depends on the diameter of the first elastic element 615. The smaller the diameter of the first elastic element 615 is, the more the first elastic elements 615 are included by the third part 613 to transmit sufficient current.

In an embodiment, the second end part 622 of the output adapting component 62 includes a second elastic element 624. When the second end part 622 is inserted into the output hollow portion 33, the second elastic element 624 is compressed and abutted against an inner wall of the output hollow portion 33, and the second end part 622 is fixed in the output hollow portion 33. Moreover, the second elastic element 624 is conductive, and the inner wall of the output hollow portion 33 is conductive and is electrically connected to the output port 34. Therefore, the second end part 622 is electrically connected to the output port 34 through the contact between the second elastic element 624 and the inner wall of the output hollow portion 33.

In an embodiment, the electric power distribution panel further includes a connection bus (not shown). The circuit breaker 5 includes an alarm terminal 53 for outputting an alarm signal. The adapter 6 includes an alarm adapting component 63 at least partially accommodated in the inner space of the housing 60. The bracket 3 includes an alarm port 35 coupled to the connection bus. When the adapter 6 is removed from the circuit breaker 5, the alarm terminal 53 is coupled to the alarm port 35. When the adapter 6 is assembled to the circuit breaker 5, the alarm adapting component 63 is coupled between the alarm terminal 53 and the alarm port 35. Therefore, no matter whether the adapter 6 is assembled to the circuit breaker 5 or not, the alarm signal can be transmitted to the connection bus for alarming when an over-current condition is detected.

From the above descriptions, the present disclosure provides an electric power distribution panel having two input buses coupled to two power sources respectively. The circuit breaker is electrically connected to one input bus through adapting provided by an adapter assembled thereto. Whereas, when the adapter is removed from the circuit breaker, the circuit breaker is electrically connected to the other input bus. Consequently, the circuit breaker is selectively coupled to two input buses, and the electric power distribution panel can provide two different output voltages, which improves the applicability.

While the disclosure has been described in terms of what is presently considered to be the most practical and preferred embodiments, it is to be understood that the disclosure needs not be limited to the disclosed embodiment.

What is claimed is:

1. An electric power distribution panel, comprising:
a first input bus coupled to a first power source;
a second input bus coupled to a second power source;
a plurality of brackets electrically connected to the first and second input buses; and
a plurality of circuit breaker modules assembled to the plurality of brackets respectively, wherein each of the plurality of circuit breaker modules comprises a circuit breaker and an adapter detachably assembled to the circuit breaker, in each of the plurality of circuit breaker modules, the circuit breaker is electrically connected to the first input bus when the adapter is removed from the circuit breaker, and the circuit breaker is electrically connected to the second input bus when the adapter is assembled to the circuit breaker.

2. The electric power distribution panel according to claim 1, wherein in each of the plurality of circuit breaker modules and a corresponding bracket, the circuit breaker comprises an input terminal and an output terminal, the input terminal is at least partially inserted into a first input hollow portion of the corresponding bracket and is electrically connected to the first input bus when the adapter is removed from the circuit breaker, and the output terminal is at least partially inserted into an output hollow portion of the corresponding bracket and is electrically connected to an output port of the corresponding bracket.

3. The electric power distribution panel according to claim 2, wherein in each of the plurality of circuit breaker modules and the corresponding bracket, the adapter comprises an input adapting component having a first part, a second part and a third part electrically connected to each other, when the adapter is assembled to the circuit breaker, the first part is electrically connected to the input terminal, the second part is inserted into the first input hollow portion, the third part penetrates through the first input hollow portion and is inserted into a second input hollow portion of the corresponding bracket and electrically connected to the second input bus, the input adapting component is insulated from the first input bus by an insulation element covering the second part, and the input terminal is electrically connected to the second input bus through the input adapting component.

4. The electric power distribution panel according to claim 3, wherein the third part of the input adapting component comprises a first elastic element, when the third part is inserted into the second input hollow portion, the first elastic element is compressed and abutted against an inner wall of the second input hollow portion, and the third part is fixed in the second input hollow portion.

5. The electric power distribution panel according to claim 4, wherein the first elastic element is conductive, the inner wall of the second input hollow portion is conductive and is electrically connected to the second input bus, and the third part is electrically connected to the second input bus through a contact between the first elastic element and the inner wall of the second input hollow portion.

6. The electric power distribution panel according to claim 3, wherein the first part of the input adapting component has a first recess, and the input terminal of the circuit breaker is engaged in the first recess when the adapter is assembled to the circuit breaker.

7. The electric power distribution panel according to claim 3, wherein a diameter of the second part is larger than or equal to a diameter of the third part.

8. The electric power distribution panel according to claim 2, wherein in each of the plurality of circuit breaker modules and the corresponding bracket, the adapter comprises an output adapting component having a first end part and a second end part electrically connected to each other, when the adapter is assembled to the circuit breaker, the first end part is electrically connected to the output terminal, the second end part is inserted into the output hollow portion and is electrically connected to the output port, and the output terminal is electrically connected to the output port through the output adapting component.

9. The electric power distribution panel according to claim 8, wherein the second end part of the output adapting component comprises a second elastic element, when the second end part is inserted into the output hollow portion, the second elastic element is compressed and abutted against an inner wall of the output hollow portion, and the second end part is fixed in the output hollow portion.

10. The electric power distribution panel according to claim 9, wherein the second elastic element is conductive, the inner wall of the output hollow portion is conductive and is electrically connected to the output port, and the second end part is electrically connected to the output port through a contact between the second elastic element and the inner wall of the output hollow portion.

11. The electric power distribution panel according to claim 8, wherein the first end part of the output adapting component has a second recess, and the output terminal of the circuit breaker is engaged in the second recess when the adapter is assembled to the circuit breaker.

12. The electric power distribution panel according to claim 2, wherein in each of the plurality of circuit breaker modules and the corresponding bracket, the circuit breaker comprises an alarm terminal for outputting an alarm signal, the adapter comprises an alarm adapting component, the corresponding bracket comprises an alarm port, the alarm terminal is coupled to the alarm port when the adapter is removed from the circuit breaker, and the alarm adapting component is coupled between the alarm terminal and the alarm port when the adapter is assembled to the circuit breaker.

13. The electric power distribution panel according to claim 12, wherein in each of the plurality of circuit breaker modules, the adapter comprises a housing formed by a first assembly and a second assembly assembled to each other, and an input adapting component, an output adapting component, and the alarm adapting component of the adapter are at least partially accommodated in an inner space of the housing.

14. The electric power distribution panel according to claim 1, wherein in each of the plurality of circuit breaker modules and a corresponding bracket, when the adapter is assembled to the circuit breaker, a projection of the adapter onto the corresponding bracket is covered by a projection of the circuit breaker onto the corresponding bracket.

* * * * *